(No Model.)
C. HERRSCHAFT.
MECHANICAL MOVEMENT.
No. 254,648. Patented Mar. 7, 1882.
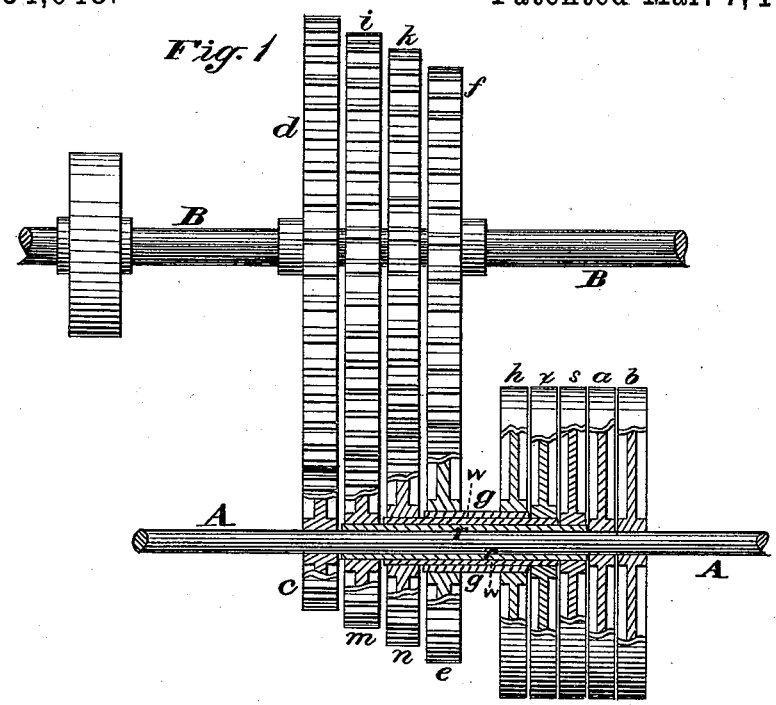
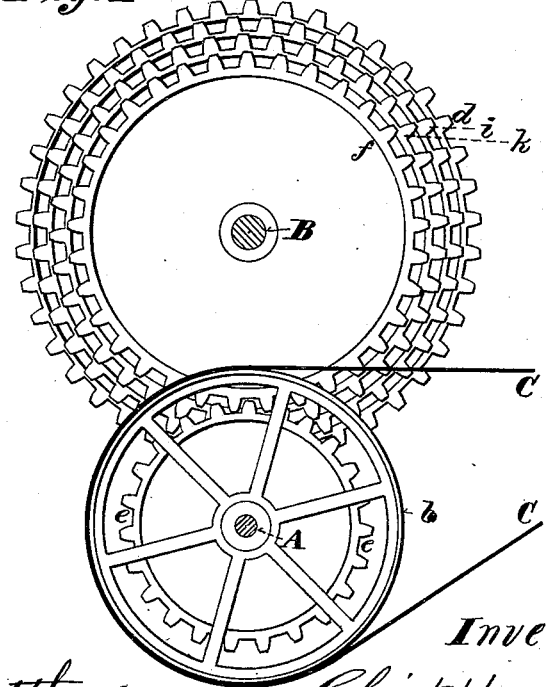
Witnesses:
Robert W. Matthews
Thomas E. Crossman
Inventor:
Christopher Herrschaft
per James A. Whitney
Attorney.

UNITED STATES PATENT OFFICE.

CHRISTOPHER HERRSCHAFT, OF BROOKLYN, NEW YORK.

MECHANICAL MOVEMENT.

SPECIFICATION forming part of Letters Patent No. 254,648, dated March 7, 1882.

Application filed January 6, 1882. (No model.)

*To all whom it may concern:*

Be it known that I, CHRISTOPHER HERRSCHAFT, of Brooklyn, in the county of Kings and State of New York, have invented an Improvement in Mechanical Movements, of which the following is a specification.

This invention is designed to provide for changing the speed of arbors or shafting without the sudden jar hitherto experienced with devices employed for such purpose; and it consists in a novel combination of parts whereby said object is secured.

Figure 1 is a side view and partial sectional view of an apparatus constructed according to my said invention, and Fig. 2 is an end view taken in a plane at right angles to Fig. 1.

A is a driving-shaft, provided with a fast pulley, $a$, and a loose pulley, $b$; also, fast upon the shaft A is a spur-pinion, $c$, which gears into a spur-wheel, $d$, on the driven shaft B, the pinion $c$ and spur-wheel $d$ being so proportioned as to give the minimum speed desired to the shaft B. The maximum speed of said shaft is secured through a spur-pinion, $e$, which gears into the spur-wheel $f$, the said spur-wheel $f$ having of course a smaller diameter than the spur-wheel $d$, while the spur-pinion $e$ has a proportionally larger diameter. The spur-pinion $e$ is fast upon a sleeve, $g$, which is concentric with the shaft A and has fast upon it a pulley, $h$. Between the spur-wheels $d$ and $f$ are two spur-wheels, $i$ and $k$, which gear respectively into two spur-pinions, $m$ and $n$, the spur-wheel $k$ being of less diameter than the spur-wheel $i$, and the spur-pinion $n$ being proportionally of larger diameter than the spur-pinion $m$. The spur-pinion is fast to a sleeve, $r$, which is loose upon the driving-shaft A, and which is fast upon its opposite extremity. The pulley $s$ and the spur-pinion $n$ are fast upon the end of a sleeve, $w$, which is loose upon the sleeve $r$, and which has fast upon its opposite end a pulley, $x$. The pulleys $h\ x\ s\ a\ b$ are all of uniform diameter, so that a belt, C, may be run from one to the other, after the ordinary manner of slipping a belt from a fast pulley to a loose pulley, &c.

It will be observed that the pinions $c$, $m$, $n$, and $e$ are each run from one or the other of the pulleys $h\ x\ s\ a$, and that the larger of the said spur-pinions gear with the smaller of the spur-wheels, and vice versa, so that the highest speed is obtained when the spur-pinion $e$ rotates the spur-wheel $f$, the next highest speed when the spur-pinion $n$ acts upon the gear-wheel $k$, the next highest when the spur-pinion $m$ acts upon the spur-wheel $i$, and the slowest when the spur-pinion $c$ acts upon the largest spur-wheel $d$, so that by these means the transfer of the driving-belt C from the pulley $a$ to the pulley $h$, instead of being done suddenly, as by the ordinary construction and operation, is done gradually, inasmuch as the speed of the shaft B is slackened by two successive steps—namely, that from the pulley $s$ to the pulley $x$ and from the latter to the pulley $h$—which interposes the action of the spur-pinion $n$ and spur-wheel $k$ and of the spur-pinion $m$ and spur-wheel $i$ between the action of the spur-pinion $e$ upon the spur-wheel $f$ and the action of the spur-pinion $c$ upon the spur-wheel $d$, thereby insuring a transition from one degree of velocity to another without the sudden jar which has accompanied the use of the pulley $a$ and its adjuncts in connection with the pulley $h$ and its adjuncts, as has hitherto been done.

For convenience of description I may term the spur-pinions $m\ n$ as "idler-pinions," and in like manner the spur-wheels $i\ k$ as "idler spur-wheels," their importance arising not so much from their action in rotating the shaft B as from the fact that they reduce and destroy the concussion which would otherwise arise from shifting the speed of said shaft from one ratio of velocity to another. Of course, when the movement of the driving-belt C is from the pulley $h$ to the pulley $a$ the speed of the shaft B will be quickened instead of slackened, and with the same avoidance of jar as in the reverse operation. When the belt is run upon the pulley $b$ no motion will be communicated to any of the parts other than said pulley, inasmuch as the latter is loose upon the said shaft.

It is to be understood that the spur-pinions and the spur-wheels hereinbefore described, instead of connecting one with the other by teeth, after the manner of gearing, may be made with smooth faces or perimeters, and connected by bands or belts; or, when desired, the connections between the said pinions and the said wheels may be made after the manner of what is commonly known as "frictional gearing."

It is also to be observed that additional intermediate pinions and wheels may be added to those interposed, as hereinbefore explained, in proportion as the difference between the fastest and slowest speed of the shaft B is desired.

What I claim as my invention is—

The combination of the idler-pinions $m$ $n$, idler spur-wheels $i$ $k$, and the pulleys $s$ $x$ and sleeves $w$ $r$, with the driving-shaft A, carrying the pulleys $a$ $h$, sleeve $g$, and pinions $e$ $c$, and the driven shaft B, carrying the spur-wheels $f$ $d$, the idler-pinions $m$ $n$ being placed between the pinions $e$ $c$, and the several parts being constructed, combined, and arranged substantially as described, to effect the purpose herein set forth.

CHRISTOPHER HERRSCHAFT.

Witnesses:
THOMAS E. CROSSMAN,
ROBERT W. MATTHEWS.